(12) United States Patent
O'Kane et al.

(10) Patent No.: US 9,811,793 B1
(45) Date of Patent: Nov. 7, 2017

(54) SYSTEM AND METHOD LINKING USE CASE DOCUMENTS TO BUSINESS PROCESS DOCUMENTS

(71) Applicant: Sprint Communications Company L.P., Overland Park, KS (US)

(72) Inventors: Patrick M. O'Kane, Olathe, KS (US); Hanumantha R. Saripalli, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 745 days.

(21) Appl. No.: 14/272,221

(22) Filed: May 7, 2014

(51) Int. Cl.
  *G06Q 10/00* (2012.01)
  *G06Q 10/06* (2012.01)

(52) U.S. Cl.
  CPC ............... *G06Q 10/06316* (2013.01)

(58) Field of Classification Search
  CPC .............................................. G06Q 10/06316
  USPC ...................................................... 705/7.15
  See application file for complete search history.

(56) References Cited

U.S. PATENT DOCUMENTS

| | | | | |
|---|---|---|---|---|
| 6,850,252 | B1* | 2/2005 | Hoffberg | G06K 9/00369 348/E7.061 |
| 7,100,195 | B1* | 8/2006 | Underwood | G06F 9/4443 707/999.009 |
| 7,389,208 | B1* | 6/2008 | Solinsky | G06K 9/6232 382/115 |
| 7,509,626 | B1 | 3/2009 | Barnes et al. | |
| 7,962,358 | B1 | 6/2011 | Fernandez et al. | |
| 8,000,992 | B1 | 8/2011 | Marchbanks et al. | |
| 8,682,701 | B1 | 3/2014 | Knauth et al. | |
| 2003/0134648 | A1* | 7/2003 | Reed | H04W 60/00 455/456.1 |
| 2004/0030992 | A1* | 2/2004 | Moisa | G06Q 10/10 715/234 |
| 2007/0038490 | A1* | 2/2007 | Joodi | G06Q 10/06 705/7.36 |
| 2008/0015880 | A1* | 1/2008 | Freedenberg | G06Q 10/101 705/80 |

(Continued)

OTHER PUBLICATIONS

Bandwidth Monitoring, Dec. 3, 2008, OpManager, https://www.manageengine.com/network-monitoring/bandwidth-monitoring.html, p. 1-5.*

(Continued)

*Primary Examiner* — Beth V Boswell
*Assistant Examiner* — Joseph Waesco (57) ABSTRACT

A system for information technology (IT) process management. The system comprises a processor, one or more memory storage devices coupled to the processor, and a document composer tool comprising a plurality of enterprise use case documents to locate an enterprise use case document relevant to an IT project based on input keywords and to link an enterprise use case document to at least one relevant enterprise business process document when an enterprise use case document is updated, wherein an enterprise use case document comprises a link referring to at least one enterprise business process document. The system further comprises an enterprise business process repository stored in at least one of the memory storage devices comprising a plurality of enterprise business process documents, wherein an enterprise business process document comprises a set of steps to accomplish a specific organizational goal.

20 Claims, 4 Drawing Sheets

(56) References Cited

U.S. PATENT DOCUMENTS

| | | | |
|---|---|---|---|
| 2009/0018984 A1* | 1/2009 | Solinsky | G06N 3/02 |
| | | | 706/12 |
| 2009/0254399 A1* | 10/2009 | Cristol | G06Q 30/02 |
| | | | 705/7.36 |
| 2009/0254906 A1* | 10/2009 | Zhang | G06Q 10/06 |
| | | | 718/101 |
| 2010/0023919 A1* | 1/2010 | Chaar | G06Q 10/06 |
| | | | 717/101 |
| 2012/0151600 A1* | 6/2012 | Yun | G06F 21/125 |
| | | | 726/26 |
| 2013/0036060 A1* | 2/2013 | Kumar | G06Q 10/06 |
| | | | 705/301 |
| 2013/0185693 A1* | 7/2013 | Chaar | G06Q 10/06 |
| | | | 717/102 |

OTHER PUBLICATIONS

Bacon, et al., "Impact Assessment for Project", U.S. Appl. No. 12/198,929, filed Aug. 27, 2008.

\* cited by examiner

SYSTEM AND METHOD LINKING USE CASE DOCUMENTS TO BUSINESS PROCESS DOCUMENTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A project may be a temporary endeavor undertaken to create a unique product or service. Assessing project impacts on functions and organizations within an enterprise may be a lengthy and difficult process. For example, employees and/or contractors may be subjectively selected from numerous organizations, or areas, in the enterprise to evaluate potential impacts on both organizations and functions supported by the organizations. An evaluation meeting may constitute a waste of time for some erroneously selected employees whose organizations are not impacted by the project. Subsequent to the evaluation meeting, discoveries of unanticipated project impacts may result in a project manager requiring most or all of the previously selected employees to meet in a second evaluation meeting, this time with additional employees from organizations where the project's impact was unanticipated. The second evaluation meeting may result in overturning or revising previous project decisions made in the first evaluation meeting because the first evaluation meeting failed to take all project impacts into account. Overturning or revising previous project decisions may result in wasting some of the resources expended in implementing the previous project decisions. Halting project development for the second evaluation meeting may result in unnecessary delays in the project development. Repeated evaluation meetings may constitute an inefficient use of time for the initially selected employees.

SUMMARY

In an embodiment, a system for information technology (IT) process management is disclosed. The system comprises a processor, one or more memory storage devices coupled to the processor, and a document composer tool comprising a plurality of enterprise use case documents to locate an enterprise use case document relevant to an IT project based on input keywords and to link an enterprise use case document to at least one relevant enterprise business process document when an enterprise use case document is updated, wherein an enterprise use case document comprises a link referring to at least one enterprise business process document. The system further comprises an enterprise business process repository stored in at least one of the memory storage devices comprising a plurality of enterprise business process documents, wherein an enterprise business process document comprises a set of steps to accomplish a specific organizational goal. The system further comprises a portfolio management component stored in at least one of the memory storage devices and configured to locate the at least one enterprise business process document through a link in the enterprise use case document, send data from the document composer tool and the enterprise business process repository to a partner pipeline management component, wherein the partner pipeline management component promotes IT project bandwidth constraint identification before execution of an IT project, wherein an IT project bandwidth is the total resource capacity supporting IT projects, wherein an IT project bandwidth constraint occurs when the same resource is insufficient for executing multiple projects at the same time, and automatically identify process change tasks with an assigned owner or group for each task, wherein the process change tasks are defined in the enterprise business process document. The portfolio management component is configured to further automatically send notification to stakeholders and groups impacted by the IT project about the project and about meetings for the project, wherein the impacted stakeholders and groups are defined in the enterprise business process document, track status of tasks undertaken by the impacted groups, and automatically send notification to relevant stakeholders for approval of completed tasks after completed tasks are uploaded by the impacted groups.

In an embodiment, a method of managing information technology (IT) processes is disclosed. The method comprises inputting keywords of an IT project into a document composer tool, wherein a document composer tool is a software application comprising enterprise use case documents to locate an enterprise use case document relevant to an IT project based on input keywords, wherein an enterprise use case document comprises a link referring to at least one enterprise business process document, wherein an enterprise business process document comprises a set of steps to accomplish a specific organizational goal. The method further comprises if no enterprise use case document is found based on the input keywords, creating an enterprise use case document based on the input keywords. The method further comprises if an enterprise use case document is found based on the input keywords: locating the at least one enterprise business process document through the link in the enterprise use case document, and sending, by a portfolio management component, data from the document composer tool and an enterprise business process repository to a partner pipeline management component, wherein the partner pipeline management component promotes IT project bandwidth constraint identification before execution of an IT project, wherein an IT project bandwidth is the total resource capacity supporting IT projects, wherein an IT project bandwidth constraint occurs when the same resource is insufficient for executing multiple projects at the same time. The method further comprises automatically sending, by the portfolio management component, notification to stakeholders and groups impacted by the IT project about the project and about meetings for the project, wherein the impacted stakeholders and groups are defined in the enterprise business process document. The method further comprises automatically identifying, by the portfolio management component, process change tasks with an assigned owner or group for each task, wherein the process change tasks are defined in the enterprise business process document, tracking status of tasks undertaken by the impacted groups, and automatically sending notification to relevant stakeholders for approval of completed tasks after tasks are uploaded by the impacted groups. The method further comprises linking, by the document composer tool, the enterprise use case document with at least one enterprise business process document after approvals are received, automatically generating reports every predefined time interval, and promoting tracking and supporting audits and governance of the enterprise use case documents and enterprise business process documents.

In an embodiment, a method of managing information technology (IT) processes is disclosed. The method comprises inputting keywords of an IT project into a use case tool, wherein a use case tool is a software application comprising use case documents and links from a use case document to at least one business process, wherein a business process document comprises a set of steps to accomplish a specific organizational goal. The method further comprises if no use case document is found based on the input keywords, creating a use case document based on the input keywords. The method further comprises if a use case document is found based on the input keywords: locating the at least one business process document through the link in the use case document, and sending, by a portfolio management component, data from the use case tool and a business process repository to a partner pipeline management component, wherein the partner pipeline management component promotes IT project bandwidth constraint identification before execution of an IT project, wherein an IT project bandwidth is the total resource capacity supporting IT projects, wherein an IT project bandwidth constraint occurs when the same resource is insufficient for executing multiple projects at the same time. The method further comprises modifying pipelines of IT projects based on identified bandwidth constraints, wherein a pipeline of an IT project is the sequence of process change tasks of the IT project. The method further comprises automatically sending, by the portfolio management component, notification to stakeholders and groups impacted by the IT project about the project and about meetings for the project, wherein the impacted stakeholders and groups are defined in the business process document. The method further comprises automatically identifying, by the portfolio management component, process change tasks with an assigned owner or group for each task, wherein the process change tasks are defined in the business process document, tracking status of tasks undertaken by the impacted groups, automatically sending notification to relevant stakeholders for approval of completed tasks after completed tasks are uploaded by the impacted groups, and linking, by a document composer tool, the updated use case document with at least one business process document after approvals are received.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

When an information technology (IT) project is approved by partners and assigned to a project manager, a functional requirement specification (FRS) document and/or a system definition specification (SDS) typically do not include project specific process requirements. If process owners are not engaged during early phases of an IT project, the introduction of the IT project into production may be delayed or create production roll-out problems that degrade customer satisfaction. The present disclosure teaches a system and method for linking an enterprise use case (EUC) document and an enterprise business process (EBP) document and automation in an IT project development that reduces unexpected process impacts due to production roll-out.

For example, when an IT project is approved by partners, keywords of the IT project may be input into a document composer tool to search for a relevant enterprise use case document. A document composer tool is a software application comprising enterprise use case documents to locate an enterprise use case document relevant to an IT project based on input keywords. If no relevant enterprise use case document is found, an enterprise use case document may be created based on the input keywords. When an enterprise use case document is found based on the input keywords, a relevant enterprise business process document may be located through a link embedded in the enterprise use case document. While the teachings of this disclosure are often presented in terms of the enterprise business process and/or enterprise use cases, it is understood that these teachings may also be applied to business processes and/or use cases. A business process may comprise a set of steps to accomplish a specific organizational goal. An enterprise business process may be a business process at a higher level and may be more general than a business process.

Data from the document composer tool and an enterprise business process repository may be sent by a portfolio management component to a partner pipeline management component. For example, the portfolio management component may extract information from an enterprise use case document and/or a relevant enterprise business process document to send to the partner pipeline management component. The enterprise use case document may be obtained by the portfolio management component from the document composer tool. The enterprise business process document may be obtained by the portfolio management component from the enterprise business process repository. The partner pipeline management component may promote identification of IT project bandwidth constraint before execution of an IT project. An IT project bandwidth is the total resource capacity supporting IT projects. Resources that support IT projects may comprise manpower, hardware, software, and/or another type of resource. An IT project bandwidth constraint occurs when the same resource is insufficient for executing multiple projects at the same time. Pipelines of IT projects may be modified by the pipeline management component based on identified bandwidth constraints, for example to prevent an IT project bandwidth constraint from occurring. A pipeline of an IT project is the sequence of process change tasks of the IT project. As a result of the pipeline change, the schedule and staffing of an IT project may be adapted according to the pipeline change.

Notification may be automatically sent by the portfolio management component to stakeholders and groups impacted by the IT project about the project and about meetings for the project. The impacted stakeholders and groups may be defined in the enterprise business process document. Process change tasks may be automatically identified by the portfolio management component with an assigned owner or group for each task. The process change tasks may also be defined in the enterprise business process document. Status of tasks undertaken by the impacted groups is tracked by the portfolio management component and may be displayed by a dashboard of the portfolio management component.

When a task is completed, the modified process of the IT project may be uploaded by the relevant group, for example to the portfolio management component or the enterprise business process repository. However, the enterprise business process process document may not be officially updated until approval has been received from applicable stakeholder(s). Notification may be automatically sent by the portfolio management component to relevant stakeholders for approval of completed tasks after tasks are uploaded by the impacted groups. The enterprise use case document may be linked by the document composer tool with at least one enterprise business process document after approvals are received. For example, at least a link may be composed in the enterprise use case document by the document composer tool with each link referring to a relevant enterprise business process document. The impacted groups may be notified of the approval of completed tasks from the stakeholders. Reports may be automatically generated every predefined time interval by the portfolio management component. Tracking and supporting audits and governance of the enterprise use case documents and enterprise business process documents may be promoted by the portfolio management component.

The system promotes using use case documents as a touch point to assure that impacted processes are identified and considered for constraints on the development plans and schedules. The system further promotes including stakeholders of the impacted processes for approvals and notifications related to the subject development project.

Figure 1:
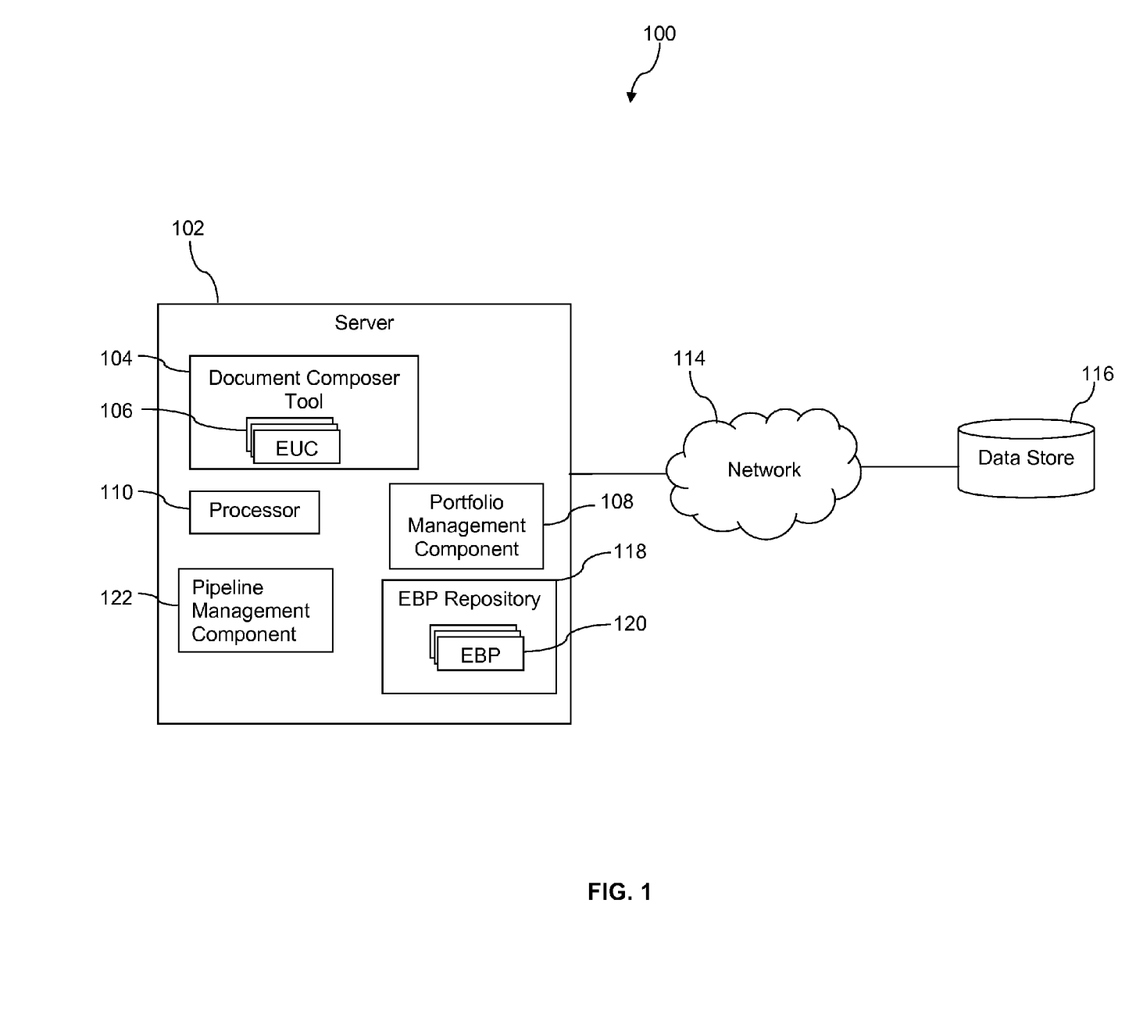
FIG. 1 is an illustration of a communication system according to an embodiment of the disclosure.

Turning now to FIG. 1, a communication system 100 is described. In an embodiment, the communication system 100 comprises a server computer 102 and a data store 116. The server 102 may comprise a processor 110, a document composer tool 104, a portfolio management component 108, a pipeline management component 122, and an enterprise business process repository 118. The document composer tool 104 may comprise a plurality of enterprise use case documents 106. The enterprise business process repository 118 may comprise a plurality of enterprise business process documents 120. The server 102 may have access to a network 114. The data store 116 may also have access to the network 114. The network 114 may comprise any combination of private and public networks.

It is understood that the system 100 may comprise any number of servers 102 and any number of data stores 116. The server computer 102 may be any of a desktop computer, a server computer, or another network capable device. Computer systems are described further hereinafter. The server 102 and the data store 116 may communicate through a private internal network and/or public external network.

The document composer tool 104, the portfolio management component 108, the pipeline management component 122, and the enterprise business process repository 118 may be stored in one computer—for example, a server computer, in four different computers—for example, a first server computer for the document composer tool 104, a second server computer for the portfolio management component 108, a third server computer for the pipeline management component 122, and a fourth server computer for the enterprise business process repository 118, in multiple different computers—for example, a first set of multiple server computers for the document composer tool 104, a second set of multiple computers for the portfolio management component 108, a third set of multiple server computers for the pipeline management component 122, and a fourth set of multiple computers for the enterprise business process repository 118, or in some other combination of computers. In an embodiment, the enterprise use cases 106 and/or the enterprise business process repository 118 may be stored in the data store 116 or another data store. Alternatively, some of the document composer tool 104, the portfolio management component 108, the pipeline management component 122, and the enterprise business process repository 118 may be stored in computers, and the rest may be stored in the data store 116 or another data store.

In an embodiment, the enterprise business process repository 118 may comprise a plurality of enterprise business process documents 120. While the teachings of this disclosure are often presented in terms of the enterprise business process and/or enterprise use cases, it is understood that these teachings may also be applied to business processes and/or use cases. A business process may comprise a set of steps to accomplish a specific organizational goal. For example, a business process may comprise a structured, measured set of activities designed to produce a specified output for a particular customer or market. An enterprise business process may be a business process at a higher level and may be more general than a business process. The enterprise business process repository 118 may be updated with the latest version of an enterprise business process document 120 when any change is made to the enterprise business process document 120 by the portfolio management component 108.

The document composer tool 104 may be a software application that comprises a plurality of enterprise use case documents 106. When executed by the processor 110, the document composer tool 104 may be utilized to locate an enterprise use case document 106 relevant to an IT project based on input keywords. Additionally, the document composer tool 104 may compose a link referring to a relevant enterprise business process document 120 in an enterprise use case document 106.

For example, when keywords "disconnect service" of an IT project are input into a user interface of the document composer tool 104, enterprise use case document(s) 106 relevant to "disconnect service" may be located by the document composer tool 104. If no relevant enterprise use case document 106 is found based on the input keywords, an enterprise use case document 106 may be created by the document composer tool 104 based on the input keywords. An enterprise use case document 106 may be updated by the document composer tool 104 when any change is made to the enterprise use case document 106 by an impacted group or a stakeholder and the change has been approved by relevant stakeholder(s). The change may be updated in a revision history of the enterprise use case document 106.

The document composer tool 104 may perform composition of a link referring to a relevant enterprise business process document 120 at a variety of times, for example when an enterprise use case document 106 is created for the first time, when an enterprise use case document 106 is updated, or at some other time. A use case may comprise a sequence of actions, including variants, that a software system performs that yields an observable result of value to a particular actor, for example a user of the software system. An ECU may be a use case at a higher level that corresponds to an enterprise business process. An enterprise use case document 106 may be updated after approvals from relevant stakeholders are received. An enterprise use case document 106 may refer to more than one relevant enterprise business process document 120, for example with multiple links, each link referring to a relevant enterprise business process document 120. In an embodiment, the document composer tool 104 may also compose a link referring back to a relevant enterprise use case document 106 in an enterprise business process document 120. The composition may be performed by the document composer tool 104 at a variety of times, for example when an enterprise business process document 120 is created for the first time, when an enterprise business process document 120 is updated, or at some other time. An enterprise business process document 120 may be updated after approvals from relevant stakeholders are received. An enterprise business process document 120 may refer to more than one relevant enterprise use case document 106, for example with multiple links, each link referring to a relevant enterprise use case document 106.

The portfolio management component 108 may be a software application that performs a variety of functionality to manage information technology (IT) projects, enterprise business process documents 120, and/or enterprise use case documents 106. For example, when executed by the processor 110, the portfolio management component 108 may communicate with the pipeline management component 122, the document composer tool 104, and/or the enterprise business process repository 118 to perform IT project related activities.

The portfolio management component 108 may locate the relevant enterprise business process document 120 of the enterprise use case document 106 through a link in the enterprise use case document 106. For example, when the document composer tool 104 locates an enterprise use case document 106 based on input keywords, a link may be found in the enterprise use case document 106 referring to a relevant enterprise business process document 120. The document composer tool 104 may send a message/notification to the portfolio management component 108 with information about the link from the enterprise use case document 106 or information about the enterprise use case document 106. The portfolio management component 108 may locate the relevant enterprise business process document 120 in the enterprise business process repository 118 with the received information from the document composer tool 104. For example, the portfolio management component 108 may request the enterprise business process repository 118 for the enterprise business process document 120 with the link information of the enterprise business process document 120. The enterprise business process repository 118 may transmit information of the enterprise business process document 120 to the portfolio management component 108 if the enterprise business process document 120 is located by the enterprise business process repository 118.

The portfolio management component 108 may send data from the document composer tool 104 and the enterprise business process repository 118 to the partner pipeline management component 122. For example, the portfolio management component 108 may extract information from an enterprise use case document 106 and/or a relevant enterprise business process document 120 to send to the partner pipeline management component 122. The enterprise use case document 106 may be obtained by the portfolio management component 108 from the document composer tool 104. The enterprise business process document 120 may be obtained by the portfolio management component 108 from the enterprise business process repository 118. Alternatively, the portfolio management component 108 may extract information from the enterprise use case document 106 and/or the relevant enterprise business process document 120. Information extracted from the enterprise use case document 106 and/or the relevant enterprise business process document 120 may comprise process change tasks information, process step information, impacted group information, or some other information.

When executed by the processor 110, the partner pipeline management component 122 may promote IT project bandwidth constraint identification before execution of an IT project. An IT project bandwidth may be the total resource capacity supporting IT projects. Resources that support IT projects may comprise manpower, hardware, software, and/or another type of resource. An IT project bandwidth constraint may occur when the same resource is insufficient for executing multiple projects at the same time, for example personnel with some specific expertise. The pipelines of IT projects may be modified based on identified bandwidth constraints. A pipeline of an IT project may be the sequence of process change tasks of the IT project. As a result of the pipeline change, the IT project schedule and staffing may be adapted according to the pipeline change.

The portfolio management component 108 may automatically identify process change tasks with an assigned owner or group for each task. The process change tasks may be defined in the enterprise business process document 120. When information of the enterprise business process document 120 is obtained by the portfolio management component 108, the portfolio management component 108 may identify process change tasks. A process change task may be a task that its process may change by the IT project. Each task may have been assigned with an owner and the owner of each task may be identified by the portfolio management component 108. Notification about the project and about meetings for the project may be automatically sent by the portfolio management component 108 to stakeholders and groups impacted by the IT project. The impacted stakeholders and groups may be defined in the enterprise business process document 120 and may be obtained by the portfolio management component 108. For example, the stakeholders and impacted groups may be notified by the portfolio management component 108 of the IT project and/or the enterprise use case document 106. The enterprise use case document 106 may comprise a link referring to the relevant enterprise business process document 120. Thus, the stakeholders and impacted groups may review the IT project, the enterprise use case document 106, and/or the enterprise business process document 120. Meeting schedules may automatically be sent in the notification from the portfolio management component 108 to the stakeholders and impacted groups.

The portfolio management component 108 may track status of tasks undertaken by the impacted groups. An impacted group may be a department, an organization, or a group of an enterprise that is impacted by the IT project. This may be a group which does not actively implement the IT development but which experience a change in operations or work load when the IT development or project is rolled out. For example, roll out of an IT project of an enterprise may impact a call center of the enterprise, and the call center may be considered an impacted group. When a new feature is rolled out, users may be unfamiliar with the new feature and may generate a significant increase of calls to the customer care call center.

For example, when the tasks are undertaken by the impacted groups, task status may be tracked and/or monitored by the portfolio management component 108. Status of a task may comprise "in review", "completed", "past due", or some other type of status. The portfolio management component 108 may keep track of task status and indicate the status in a dashboard of the portfolio management component 108. Stakeholders and impacted groups may review task status through accessing the portfolio management component 108. The portfolio management component 108 may send a notification to a relevant group when the corresponding task is past due. The portfolio management component 108 may automatically send notification to relevant stakeholders for approval of completed tasks after completed tasks are uploaded by the impacted groups, for example to remind stakeholders to confirm that gate or milestone completion criteria have been satisfied.

When tasks are completed by the impacted groups and uploaded, for example uploaded to the portfolio management component 108, notification may be sent by the portfolio management component 108 to applicable stakeholders for approval. For example, the call center in a previous example may be assigned a task to boost its staffing. For example, the call center may undertake the task of conducting call center training to prepare for anticipated increased call volume resulting from roll-out of new functionality from the IT project. When the task is completed by the call center, details of the completed task may be uploaded to the portfolio management component 108, for example the number of new employees in the call center, the number of employees in the call center that have completed the call center training, or another type of information.

When all completed and uploaded tasks are approved by the stakeholders, the portfolio management component 108 may send a notification to the document composer tool 104 indicating all tasks have been uploaded and approved. The portfolio management component 108 may transmit the latest enterprise business process document 120 to the enterprise business process repository 118 or send a notification to the enterprise business process repository 118 to update the enterprise business process document 120. The portfolio management component 108 may transmit the latest enterprise use case document 106 to the document composer tool 104 or send a notification to the document composer tool 104 to update the enterprise use case document 106. The document composer tool 104 may compose a link in the enterprise use case document 106 referring to at least one relevant enterprise business process document 120. In an embodiment, the document composer tool 104 may also compose a link in the enterprise business process document 120 referring to at least one relevant enterprise use case document 106.

Reports may be automatically generated by the portfolio management component 108 periodically, for example every week, every month, every year, or at some other periodic interval. A report may comprise information on status of the IT project, the enterprise use case document 106, and/or the enterprise business process document 120. The portfolio management component 108 may comprise an option for relevant stakeholders to select to receive notification of the reports. Tracking of the enterprise use case documents 106 and enterprise business process documents 120 may be promoted by the portfolio management component 108. For example, the portfolio management component 108 may keep a record of relations of enterprise use case documents 106, enterprise business process documents 120, revision history of enterprise use case documents 106, revision history of enterprise business process documents 120, or other information on the enterprise use case documents 106 and/or enterprise business process documents 120. Audits and governance of the enterprise use case documents 106 and/or enterprise business process documents 120 may be supported by the portfolio management component 108. For example, the portfolio management component 108 may send notification to relevant personnel for audits and governance periodically, for example every month, every quarter, every year, or at some other periodic interval. The portfolio management component 108 may record the audit and governance status of the enterprise use case documents 106 and/or enterprise business process documents 120. The enterprise use case documents 106 and the enterprise business process documents 120 may be kept evergreen with the assist from the portfolio management component 108 in tracking and supporting audits and governance.

Figure 2A:
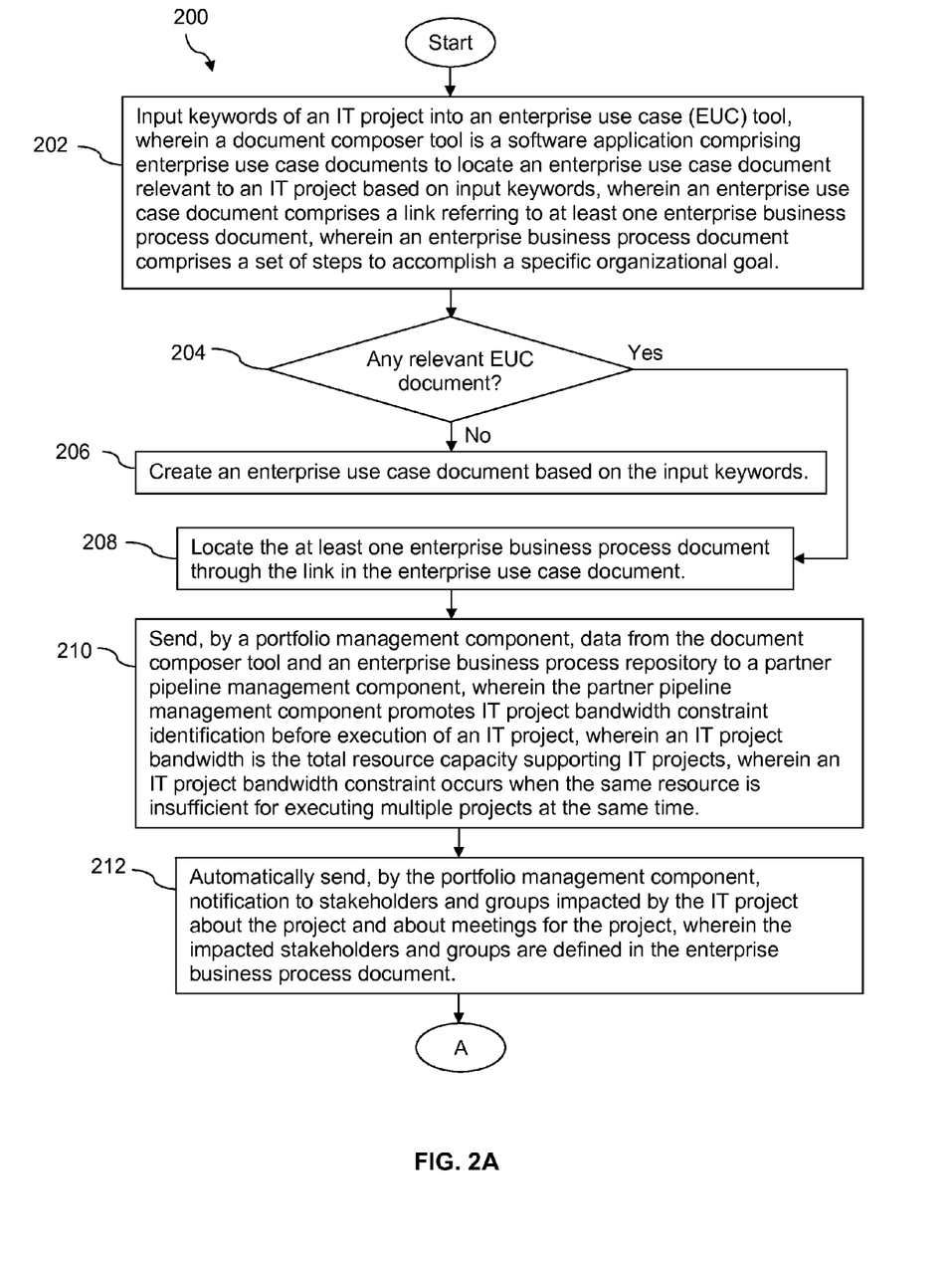
FIG. 2A and FIG. 2B is a flow chart illustrating a method according to an embodiment of the disclosure.
Figure 2B:
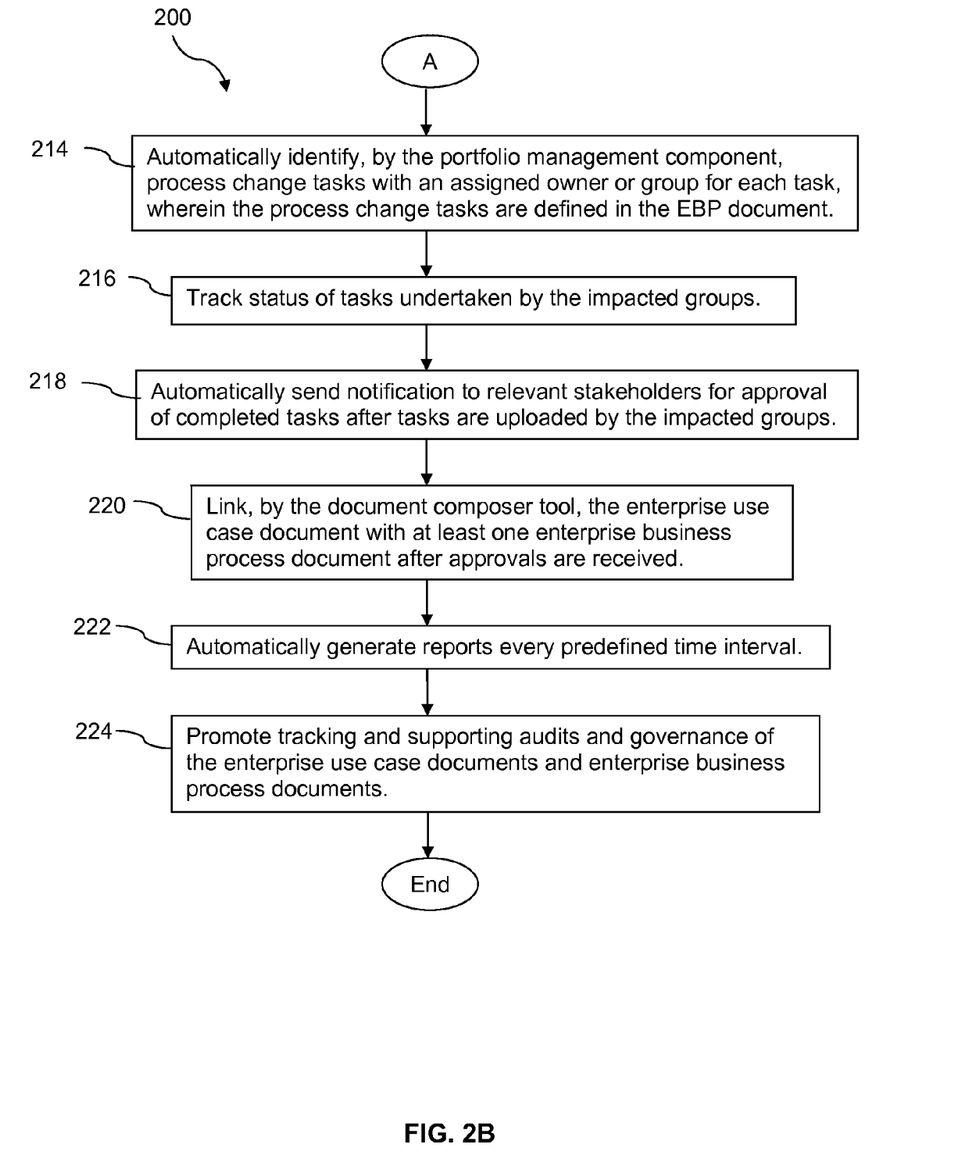

Turning now to FIG. 2A and FIG. 2B, a method 200 is described. At block 202, keywords of an IT project are input into an enterprise use case tool, wherein a document composer tool is a software application comprising enterprise use case documents to locate an enterprise use case document relevant to an IT project based on input keywords. An enterprise use case document comprises a link referring to at least one enterprise business process document. An enterprise business process document comprises a set of steps to accomplish a specific organizational goal. For example, when an IT project is built, keywords of the IT project may be input into the document composer tool 104. The document composer tool 104 may search for an enterprise use case document 106 relevant to the IT project based on the input keywords. Each enterprise use case document 106 may comprise a link referring to at least one relevant enterprise business process document 120. An enterprise business process document 120 may comprise a set of steps to accomplish a specific organizational goal.

At block 204, it is determined whether any relevant enterprise use case document is found based on the input keywords. For example, if the result of block 204 is false, which means no relevant enterprise use case document 106 is found based on the input keywords, the process/method may proceed to block 206. On the other hand, if the result of block 204 is true, which means a relevant enterprise use case document 106 is found based on the input keywords, the method may proceed to block 208. At block 206, an enterprise use case document is created based on the input keywords. For example, an enterprise use case document 106 may be created based on the input keywords. At block 208, the at least one enterprise business process document is located through the link in the enterprise use case document. For example, the portfolio management component 108 may locate the at least one relevant enterprise business process document 120 through the link in the enterprise use case document 106. The information of the enterprise use case document 106 comprising the link to the at least one relevant enterprise business process document 120 may be obtained by the portfolio management component 108 from the document composer tool 104.

At block 210, data from the document composer tool and an enterprise business process repository is sent by a portfolio management component to a partner pipeline management component, wherein the partner pipeline management component promotes IT project bandwidth constraint identification before execution of an IT project. An IT project bandwidth is the total resource capacity supporting IT projects. An IT project bandwidth constraint occurs when the same resource is insufficient for executing multiple projects at the same time. For example, data from the document composer tool 104 and the enterprise business process repository 118 may be sent by the portfolio management component 108 to the partner pipeline management component 108. The partner pipeline management component 108 may promote IT project bandwidth constraint identification before execution of an IT project. An IT project bandwidth may be the total resource capacity supporting IT projects. The resources that support IT projects may comprise manpower, hardware, software, and/or another type of resource.

An IT project bandwidth constraint may occur when the same resource is insufficient for executing multiple projects at the same time. For example, personnel with some specific expertise may be desirable by multiple IT projects at the same time when the IT projects progress to a certain point. It may be desirable to avoid this type of bandwidth constraint. When visibility of progress of multiple IT projects is presented by the pipeline management component 122, the bandwidth constraint may be avoided by modifying pipelines of IT projects. A pipeline of an IT project may be the sequence of process change tasks of the IT project. The partner pipeline management component 122 may promote IT project bandwidth constraint identification before execution of an IT project.

At block 212, notification is automatically sent by the portfolio management component to stakeholders and groups impacted by the IT project about the project and about meetings for the project, wherein the impacted stakeholders and groups are defined in the enterprise business process document. For example, the portfolio management component 108 may send notification to stakeholders and groups impacted by the IT project about the project and about meetings for the project. In an embodiment, the impacted stakeholders and groups may be defined in the enterprise business process document 120.

At block 214, process change tasks are automatically identified by the portfolio management component with an assigned owner or group for each task, wherein the process change tasks are defined in the enterprise business process document. For example, process change tasks may be automatically identified by the portfolio management component 108 and each task may have been assigned an owner or a group. An owner of a process change task may be a relevant stakeholder. When the process change task is completed by impacted group(s), the owner may approve the completed task before the enterprise business process document 120 and/or the enterprise use case document 106 is updated with the modified task.

At block 216, status of tasks undertaken by the impacted groups is tracked. For example, status of tasks undertaken by the impacted groups is tracked by the portfolio management component 108. Status of a task may comprise "in review", "completed", "past due", or another type of status.

At block 218, notification is automatically sent to relevant stakeholders for approval of completed tasks after tasks are uploaded by the impacted groups. For example, notification may be automatically sent by the portfolio management component 108 to relevant stakeholders for approval of completed tasks after tasks are uploaded by the impacted groups. When all approvals have been received for all process change tasks of the IT project, the portfolio management component 108 may send a notification to the document composer tool 104 and/or the enterprise business process repository 118 indicating all tasks have been uploaded and approved. The portfolio management component 108 may transmit the latest enterprise business process document 120 to the enterprise business process repository 118 or send a notification to the enterprise business process document 120 to update the enterprise business process document 120. The portfolio management component 108 may transmit the latest enterprise use case document 106 to the document composer tool 104 or send a notification to document composer tool 104 to update the enterprise use case document 106.

At block 220, the enterprise use case document is linked by the document composer tool with at least one enterprise business process document after approvals are received. For example, the enterprise use case document 106 may be linked by the document composer tool 104 with at least one relevant enterprise business process document 120 after the approvals of the tasks are received. For example, the document composer tool 104 may compose at least one link in the enterprise use case document 106 with each link referring to one relevant enterprise business process document 120.

At block 222, reports are automatically generated every predefined time interval. For example, reports may be automatically generated by the portfolio management component 108 periodically, for example every week, every month, every year, or at some other periodic interval. At block 224, tracking and supporting audits and governance of the enterprise use case documents and enterprise business process documents are promoted. For example, tracking and supporting audits and governance of the enterprise use case documents 106 and/or the enterprise business process documents 120 may be promoted by the portfolio management component 108.

Figure 3:
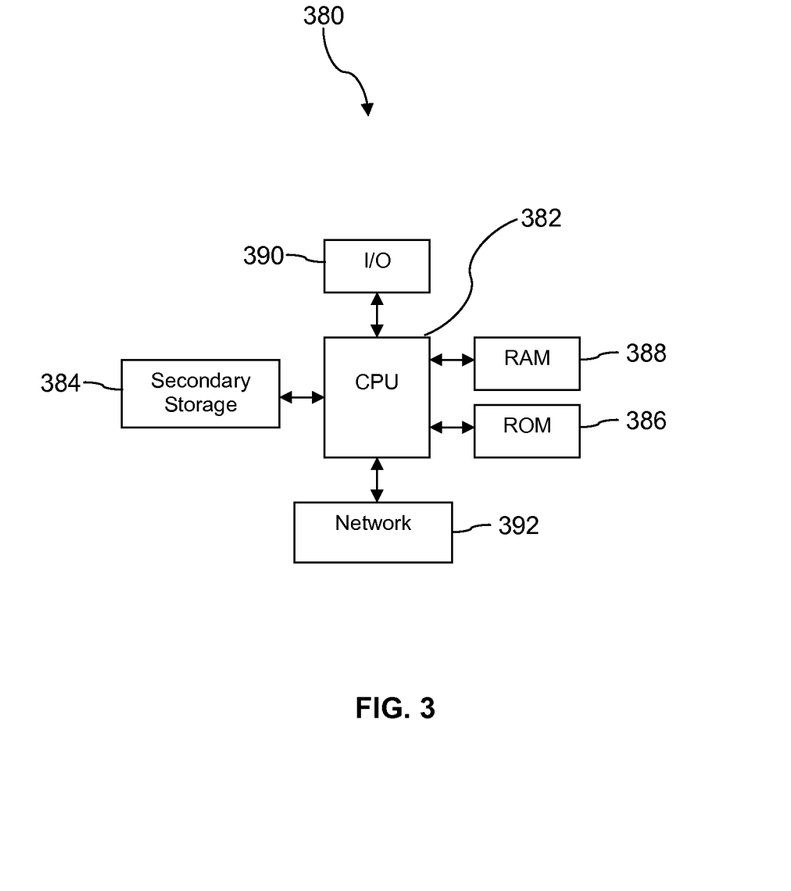
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for information technology (IT) process management on a network, the system comprising:
   a server that is communicatively coupled to the network, the server comprising:
      a processor;
      one or more memory storage devices coupled to the processor, the one or more memory storage devices comprising: a plurality of enterprise use case documents and an enterprise business process repository that comprises a plurality of enterprise business documents that each comprise a set of steps to accomplish a specific organizational goal;
      a document composer tool stored in the one or more memory storage devices such that upon execution by at least the processor, the server:
         locates an enterprise use case document from the one or more storage devices relevant to an IT project based on input keywords, and
         links the located enterprise use case document to at least one relevant enterprise business process document in the enterprise business process repository in response to the enterprise use case document being updated, wherein the enterprise use case document comprises a link referring to at least one enterprise business process document in the enterprise business process repository;
      a portfolio management component stored in at least one of the memory storage devices such that upon execution by at least the processor, the server:
         locates the at least one enterprise business process document through the link in the enterprise use case document,
         extracts business process data from the at least one enterprise business process document based on the link,
         in response to the extraction of business process data, sends the business process data from the document composer tool and the enterprise business process repository to a partner pipeline management component executing on the server,
         automatically identifies process change tasks with an assigned owner or group for each task, wherein the process change tasks are defined in the at least one enterprise business process document,
         automatically sends notification to stakeholders and groups impacted by the IT project about the IT project and about meetings for the IT project, wherein the impacted stakeholders and groups are defined in the at least one enterprise business process document,
         tracks status of tasks undertaken by the impacted groups, and
         automatically sends notification to relevant stakeholders for approval of completed tasks after completed tasks are uploaded by the impacted groups; and
      the partner pipeline management component stored in at least one of the memory storage devices such that upon execution by at least the processor, the server:
         identifies, based on the business process data from the document composer tool and the enterprise business process repository by way of the link in the enterprise use case document, IT project bandwidth constraints on the network before execution of an IT project via the network, wherein an IT project bandwidth is the total resource capacity supporting IT projects including hardware and software resources, and wherein an IT project bandwidth constraint occurs when the same hardware or software resource is insufficient for executing multiple IT projects at the same time on the network, and
         modifies one or more pipelines of projects based on the identified IT project bandwidth constraints.

2. The system of claim 1, wherein pipelines of IT projects are modified based on identified bandwidth constraints.

3. The system of claim 2, wherein an IT project schedule is adapted according to the pipeline change.

4. The system of claim 1, wherein a link from an enterprise business process document to an enterprise use case document is automatically composed by the document composer tool.

5. The system of claim 4, wherein the link from the enterprise business process document refers to more than one enterprise use case document.

6. The system of claim 1, wherein tracking and supporting audits and governance of the enterprise use cases and enterprise business process is promoted by the portfolio management component.

7. The system of claim 1, wherein the enterprise use case document is updated when any change is made to the enterprise use case document.

8. The system of claim 1, wherein the enterprise business process repository is updated with the latest enterprise business process document when any change is made to the enterprise business process document.

9. A method of managing information technology (IT) processes on a network, comprising:
- inputting keywords of an IT project into a document composer tool executing on a server communicatively coupled to the network, wherein the document composer tool is stored in a non-transitory memory that also stores enterprise use case documents;
- locating, by the server executing the document composer tool, an enterprise use case document relevant to an IT project based on input keywords, wherein an enterprise use case document comprises a link referring to at least one enterprise business process document stored in an enterprise business process repository, and wherein the at least one enterprise business process document comprises a set of steps to accomplish a specific organizational goal;
- in response to locating the enterprise use case document based on the input keywords:
  - locating the at least one enterprise business process document in the enterprise business process repository through the link in the enterprise use case document;
  - extracting business process data from the at least one enterprise business process document based on the link;
  - in response to extracting the business process data, sending, by the server executing a portfolio management component, the business process data from the document composer tool and the enterprise business process repository to a partner pipeline management component executing on the server;
  - identifying, by the partner pipeline management component based on the business process data from the document composer tool and the enterprise business process repository by way of the link in the enterprise use case document, IT project bandwidth constraints on the network before execution of an IT project via the network, wherein an IT project bandwidth is the total resource capacity supporting IT projects including hardware and software resources, wherein an IT project bandwidth constraint occurs when the same hardware or software resource is insufficient for executing multiple IT projects at the same time on the network;
  - modifying, by the partner pipeline management component, one or more pipelines of projects based on the identified IT project bandwidth constraints;
  - automatically sending, by the server executing the portfolio management component, notification to stakeholders and groups impacted by the IT project about the IT project and about meetings for the IT project, wherein the impacted stakeholders and groups are defined in the at least one enterprise business process document;
  - automatically identifying, by the server executing the portfolio management component, process change tasks with an assigned owner or group for each task, wherein the process change tasks are defined in the at least one enterprise business process document;
  - tracking status of tasks undertaken by the impacted groups;
  - automatically sending notification to relevant stakeholders for approval of completed tasks after tasks are uploaded by the impacted groups;
  - linking, by the server executing the document composer tool, the enterprise use case document with one or more enterprise business process document documents in the enterprise business process repository after approvals are received;
  - automatically generating reports every predefined time interval; and
  - promoting tracking and supporting audits and governance of the enterprise use case documents and enterprise business process documents.

10. The method of claim 9, further comprising notifying the impacted groups of the approval of completed tasks from the stakeholders.

11. The method of claim 9, further comprising updating the enterprise use case document when any change is made to the enterprise use case document.

12. The method of claim 11, wherein the enterprise use case document is updated in a revision history.

13. The method of claim 9, further comprising generating reports, by the server executing the document composer tool, to provide reports every predefined time interval with an option to notify applicable stakeholders.

14. The method of claim 9, wherein a link from an enterprise business process document to an enterprise use case document is composed by the document composer tool.

15. The method of claim 14, wherein the link from the enterprise business process document refers to more than one enterprise use case document.

16. The method of claim 9, wherein a pipeline of the IT project is the sequence of process change tasks of the IT project, and wherein pipelines of IT projects are modified based on identified bandwidth constraints.

17. A method of managing information technology (IT) processes on a network, comprising:
- inputting keywords of an IT project into a use case tool executing on a server communicatively coupled to the network, wherein a use case tool is stored in a non-transitory memory that also stores use case documents and links from a use case document to at least one business process document stored in an business process repository, and wherein the at least one business process document comprises a set of steps to accomplish a specific organizational goal;
- in response to locating the use case document based on the input keywords:
  - locating the at least one business process document through the link in the use case document;
  - extracting business process data from the at least one business process document based on the link;
  - in response to extracting the business process data, sending, by the server executing a portfolio management component, the business process data from the use case tool and the business process repository to a partner pipeline management component executing on the server;
  - identifying, by the partner pipeline management component based on the data from the use case tool and the business process repository by way of the link in the enterprise use case document, IT project bandwidth constraints on the network before execution of an IT project via the network, wherein an IT project bandwidth is the total resource capacity supporting IT projects including hardware and software resources, and wherein an IT project bandwidth constraint occurs when the same hardware or software resource is insufficient for executing multiple IT projects at the same time on the network;

modifying, by the partner pipeline management component, pipelines of IT projects based on identified IT project bandwidth constraints on the network, wherein a pipeline of the IT project is the sequence of process change tasks of the IT project;

automatically sending, by the server executing the portfolio management component, notification to stakeholders and groups impacted by the IT project about the IT project and about meetings for the IT project, wherein the impacted stakeholders and groups are defined in the at least one enterprise business process document;

automatically identifying, by the server executing the portfolio management component, process change tasks with an assigned owner or group for each task, wherein the process change tasks are defined in the at least one business process document;

tracking status of tasks undertaken by the impacted groups;

automatically sending notification to relevant stakeholders for approval of completed tasks after completed tasks are uploaded by the impacted groups; and linking, by the server executing a document composer tool, the updated use case document with one or more business process documents in the business process repository after approvals are received.

18. The method of claim 17, further comprising automatically generating reports, by the server executing the use case tool, every predefined time interval.

19. The method of claim 17, wherein tracking of the use case documents and business process documents is promoted, and audits and governance of the use case documents and business process documents are supported.

20. The method of claim 17, wherein a link from an enterprise business process document to an enterprise use case document is composed by the document composer tool.

* * * * *